United States Patent [19]

Kagami

[11] Patent Number: 5,164,936
[45] Date of Patent: Nov. 17, 1992

[54] OPTICAL PICKUP SYSTEM WITH VIBRATION PROTECTION

[75] Inventor: Shin Kagami, Kakuda, Japan
[73] Assignee: Alps Electric Co., Ltd., Tokyo, Japan
[21] Appl. No.: 669,795
[22] Filed: Mar. 15, 1991

[30] Foreign Application Priority Data

May 29, 1990 [JP] Japan .................... 2-139207

[51] Int. Cl.⁵ ............... G11B 7/00; G11B 21/10; G11B 17/00; G11B 21/16
[52] U.S. Cl. ................................ 369/247; 369/44.15
[58] Field of Search .......... 369/247, 248, 249, 219, 369/220, 221, 44.15, 44.16, 44.14, 44.22, 256

[56] References Cited

U.S. PATENT DOCUMENTS

| | | | |
|---|---|---|---|
| 4,669,823 | 6/1987 | Iguma et al. | 369/44.15 |
| 4,680,743 | 7/1987 | Araki | 369/219 X |
| 4,794,580 | 12/1988 | Ikedo et al. | 369/44.16 |
| 4,878,214 | 10/1989 | Hinotani | 369/256 |
| 4,932,019 | 6/1990 | Bessho | 369/247 |

FOREIGN PATENT DOCUMENTS

| | | | |
|---|---|---|---|
| 61-150137 | 7/1986 | Japan | 369/44.15 |
| 0064638 | 3/1988 | Japan | 369/44.16 |

*Primary Examiner*—John W. Shepperd
*Assistant Examiner*—Michael C. Kessell
*Attorney, Agent, or Firm*—Guy W. Shoup; David W. Heid

[57] ABSTRACT

Disclosed herein is a vibration preventive device for an optical disc player comprising a moving part supported movably relative to a stationary part, and a drive force generator including a coil fitted on either the stationary part or moving part and a magnet fitted on the other, the coil or magnet being supported resiliently on the stationary part.

4 Claims, 4 Drawing Sheets

OPTICAL PICKUP SYSTEM WITH VIBRATION PROTECTION

BACKGROUND OF THE INVENTION

1. Field of the Invention

The present invention relates to an optical disc player, such as an optomagnetic disc unit and compact disc unit, and particularly to a vibration preventive device which is designed to retard the vibration created in the source of drive force, which is made up of coils and magnets, from being transmitted to the stationary part.

2. Description of Related Art

FIG. 8 shows the focus correction device of the optical disc player.

In the figure, symbol 1 denotes a lens holder, by which an objective lens 2 is held. The objective lens 2 confronts the recording surface of the optical disc, and a laser beam from the objective lens 2 is projected on to the recording surface of the optical disc, resulting in the formation of a small light spot on the recording surface. The focus correction device shown in FIG. 8 is a servo system to make the laser beam spot projected by the objective lens 2 in-focus on the recording surface. The lens holder 1 is supported by a support member 3 such as a flat spring, and is movable finely in the direction of the optical axis (Y direction) of the objective lens 2. Focus coils 4 are provided on both sides of the lens holder 1. The support member 3 has its base supported by a pickup chassis 5 which is the stationary part of the device. Fixed on the pickup chassis 5 are U-shaped yokes 6, with a magnet 7 being fixed on the interior surface of the outer section of the yoke 6. By controlling the current flowing in the horizontal direction (orthogonal to the Y direction) in the focus coil 4, the lens holder 1 is driven for focus correction in the Y direction.

FIG. 7 shows in a sense of model the above-mentioned conventional focus correction device. This device operates to apply a drive force $F_1$ to the focus coil 4 provided on the lens holder 1 by means of the magnet 7 provided on the pickup chassis 5. The drive force $F_1$ has a counter force $F_2$, which is transmitted directly to the pickup chassis 5. In the focus correcting drive operation, the lens holder 1 is driven at current frequencies ranging from d.c. to several thousand Hz, and therefore the counter force $F_2$ is transmitted to the pickup chassis 5 as vibrations having frequencies related to the above-mentioned driving frequencies.

Transmission of such vibration to the pickup chassis 5 creates various problems.

For example, the vibration is propagated from the stationary pickup chassis 5 to the guide rail which supports the pickup chassis 5 movably, to the main chassis of the disc apparatus, and finally to the optical disc. Since the optomagnetic disc has a natural frequency of about 1.4 kHz, the above mentioned vibration will develop a problem of resonation of the disc, and the disc resonation will adversely affect the focus correcting operation of the lens holder 1.

SUMMARY OF THE INVENTION

The present invention is intended to solve the foregoing prior art deficiency, and its prime object is to provide a vibration preventive device for an optical disc player with the ability of retarding the vibration of the vibration source, which causes such impropriety as the resonation of optical disc, resulting from the counter force $F_2$ shown in FIG. 7.

The vibration preventive device based on the present invention comprises a moving part which is supported movably relative to the stationary part of the device, and a drive force generator which includes coils fitted on one of the stationary part and moving part and magnets fitted on the other, with the coils or the magnets being supported resiliently on the stationary part.

In the above arrangement, with one of the coil and magnet being fitted on the stationary part and the other is fitted on the moving part, the drive force applied to the moving part has its counter force absorbed by the resilient support on the stationary part so that the transmissibility of the vibration attributable to the counter force to the stationary part is reduced. In consequence, the vibration originating from the drive force generator made up of the coil and magnet is prevented from being transmitted to the stationary part.

DESCRIPTION OF THE PREFERRED EMBODIMENT

Figure 1:
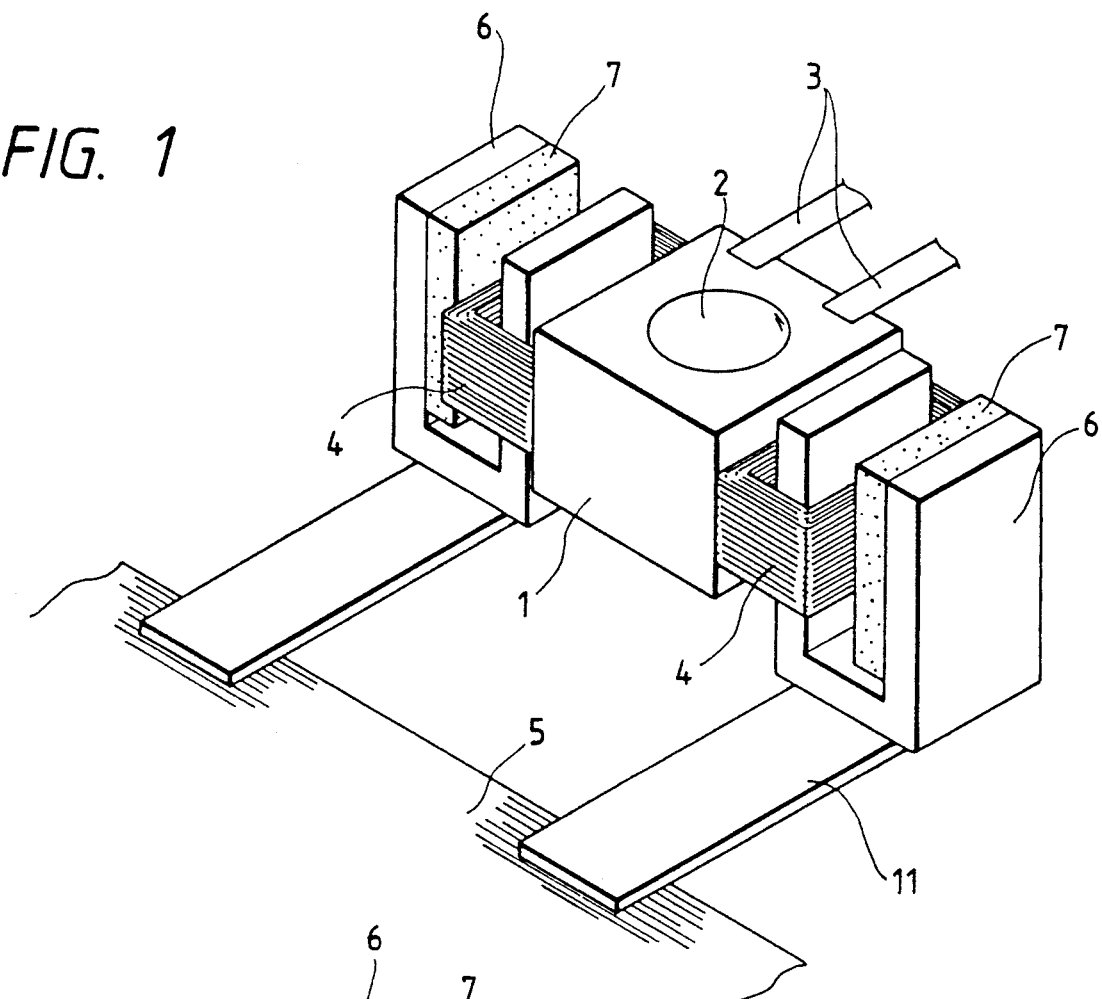
FIG. 1 is a perspective diagram showing the focus correction device based on the first embodiment of this invention.

FIG. 1 shows the first embodiment of this invention having a basic arrangement, and it is a perspective diagram of the focus correction device for an optical pickup device.

Figure 8:
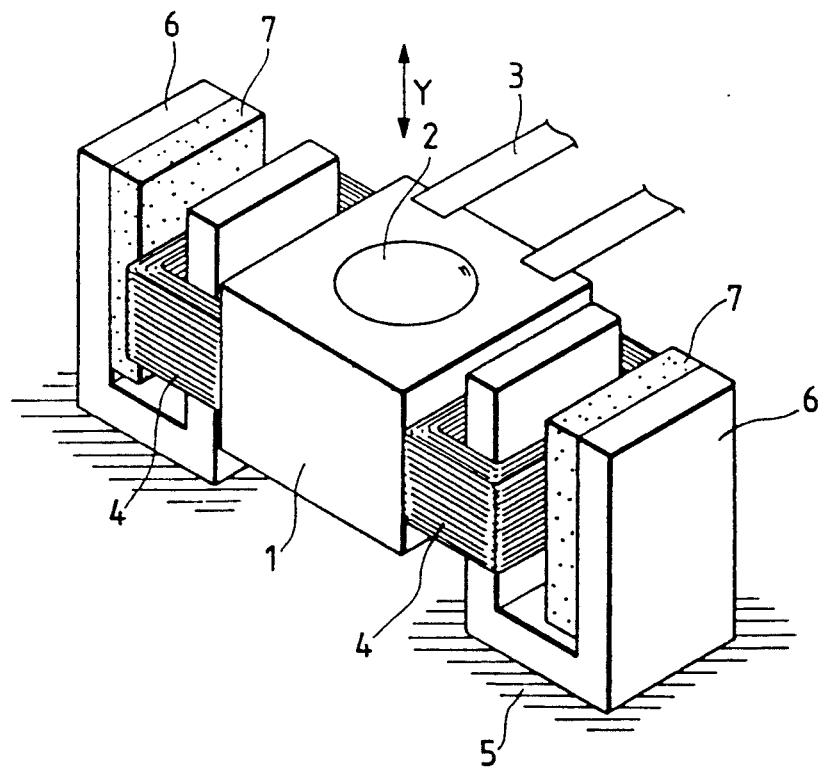
FIG. 8 is a perspective diagram showing the conventional focus correction device.

Similar to the conventional arrangement shown in FIG. 8, indicated by symbol 1 is a lens holder which holds an objective lens 2. The lens holder 1 is supported movably by a support member 3 such as a flat spring. Focus coils 4 are fitted on both sides of the lens holder 1. Indicated by 6 are yokes and 7 are magnets. The yokes 6 are supported by a pickup chassis 5, which is the stationary part, through resilient support members 11.

Figure 6:
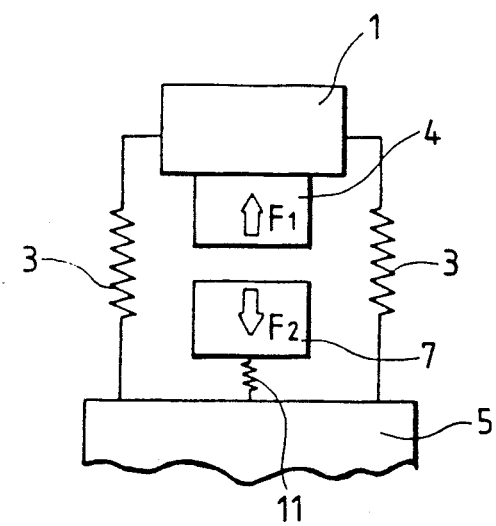
FIG. 6 is a diagram showing by model the transmission of counter force based on this invention.

FIG. 6 shows, in a sense of model, the supporting mechanism of this embodiment. A magnet 7, which is the constituent of the stationary part of the drive force generator, is supported by the pickup chassis 5 through the resilient support member 11. The magnet 7 provides a prescribed drive force $F_1$ for the focus coil 4, so that the lens is moved for the focus correction. A counter force $F_2$ imposed on the magnet 7 is transmitted to the pickup chassis 5 by being damped by the resilient support member 11. The transmissibility T of transmission of the vibration caused by the counter force $F_2$ to the pickup chassis 5 is evaluated by the following formula.

$$T = \sqrt{[1 + (2\xi\omega/\omega_n)^2]/\{[1 - (\omega/\omega_n)^2]^2 + (2\xi\omega/\omega_n)^2\}} \quad (1)$$

Where $\omega_n$ is the natural frequency of the vibration system of the portion supported by the resilient support member 11. For the yoke 6 and magnet 7 having a total mass m and the resilient support member 11 having a spring constant k in the direction of action of the counter force $F_2$, the natural frequency is given as follows.

$$\omega_n = \sqrt{k/m}$$

Also, $\xi$ is a damping coefficient. When the damping coefficient of the vibration system comprising the resilient support member 11 of spring constant k and the yoke 6 of mass m and the magnet 7 supported thereon is indicated by C, the damping coefficient is given as follows.

$$\xi = C/(2\sqrt{mk})$$

The symbol $\omega$ denotes the frequency of transmitted vibration.

As mentioned previously, the optical disc used for optomagnetic recording has a natural frequency of about 1.4 kHz, and if the vibration of this frequency is transmitted from the focus correction device to the optical disc without being damped, the optical disc will resonate and increase the amplitude of vibration. The vibration then returns to the optical pickup, which renders a vibration of about 1.4 kHz to the lens holder 1, resulting in an adverse influence on the focus correcting operation. On this account, the resilient support member 11 is designed to make the transmissibility T falling at a frequency of $\omega \approx 1.4$ kHz. The formula (1) reveals that a large value of $/\omega_n$ reduces the transmissibility T. Accordingly, in regard to the transmission of vibration at $\omega \approx 1.4$ kHz, it is necessary for the resilient support made up of the resilient support members 11, yokes 6 and magnets 7 to have its natural frequency $\omega_n$ lower than 1.4 kHz. In case the device is intended for an optomagnetic disc, if $\omega_n$ is about ⅓ of $\omega$, e.g., $\omega_n = 300-800$ Hz, the Vibration from the pickup chassis 5 is transmitted to the main chassis and to the optical disc, and the resonation of optical disc is retarded significantly. Hence, the resilient support member 11 has its spring constant k set to satisfy $\omega_n \approx 500$ Hz, for example.

Figure 2:
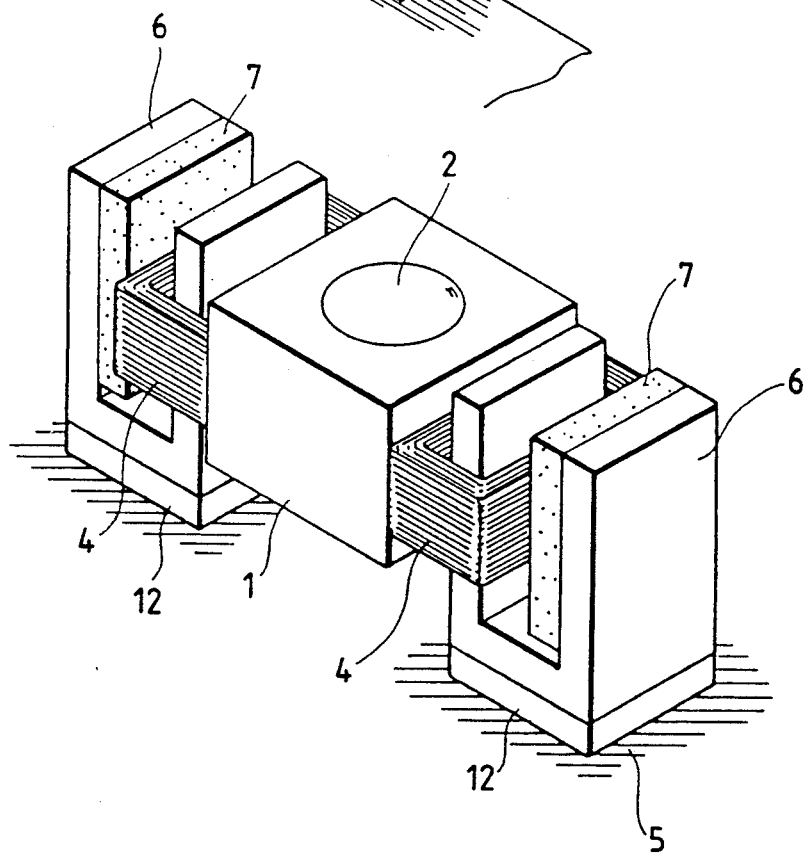
FIG. 2 is a perspective diagram showing the focus correction device based on the second embodiment of this invention.

FIG. 2 shows the basic structure of the second embodiment of this invention.

The yokes 6 are placed on the pickup chassis 5, and these members are interleaved by resilient support members 12 such as of viscous resilient material or rubber. Also in this case, the resilient support member 12 has its spring constant k in the direction of counter force $F_2$ set to provide a natural frequency ranging 300-800 Hz.

Figure 3:
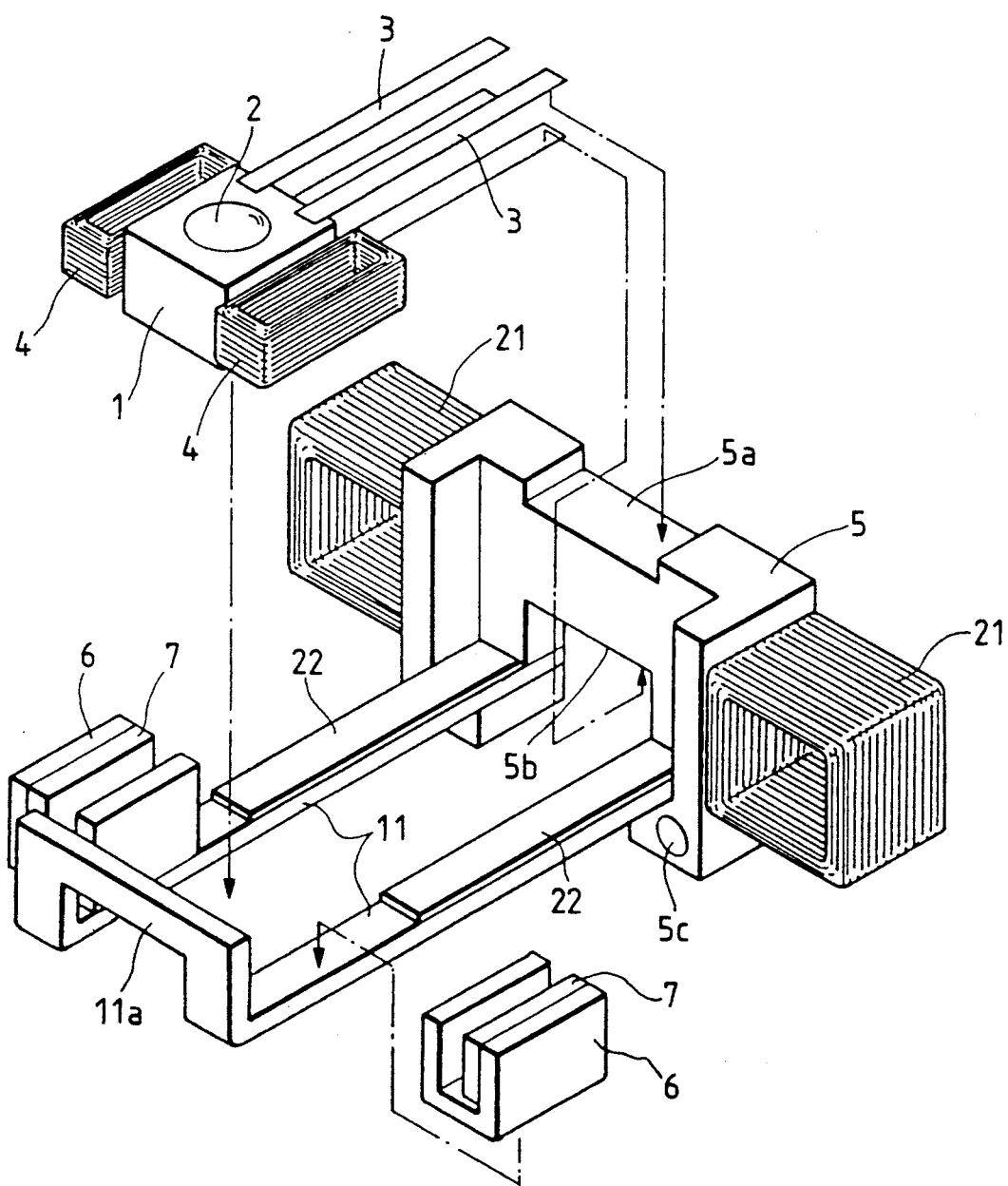
FIG. 3 is a partially expanded perspective diagram showing the focus correction device for optical disc apparatus based on a specific embodiment of this invention.

FIG. 3 shows a more specific embodiment of the present invention, and it is a pickup of an optomagnetic disc apparatus. The lens holder 1 which holds the objective lens 2 is supported by support members 3 such as four flat springs so that it can be operated for the focus correction. The pickup chassis 5 has the formation of support surfaces 5a and 5b at its top and bottom surfaces, with two upper support members 3 and lower support members 3 being glued on the support surfaces 5a and 5b, respectively. The pickup chassis 5 has the formation of a pair of slide bores 5c, in which the guide rails provided on the main chassis run through. This guide mechanism allows the objective lens 2 to move in the radial direction of the disc (the track traversing direction, i.e., tracking direction).

Provided on both sides of the pickup chassis 5 are drive coils 21 which constitute linear motors, by which the pickup chassis 5 is moved in the tracking direction. The drive force is used for implementing the high-speed access and the tracking corrective operation for the laser beam spot projected by the objective lens 2 to follow a track on the optical disc.

Each resilient support member 11 has a cantilever support by the pickup chassis 5, and the yoke 6 and magnet 7 are fixed at the end of the support member 11. The resilient support members 11 are connected with each other through a bent section 11a. The provision of the bent section 11a reduces the torsional deformation of the resilient support member 11 thereby to prevent the yokes 6 from having an excessive inclination. Placed on the surface of each resilient support member 11 is a vibration damp member 22, which is made of a viscous resilient sheet glued on the surface of the resilient support member 11 and a metallic stop plate glued on the sheet surface. By means of the vibration damp member 22, the resilient support member 11 is prevented from vibrating with a large amplitude.

Figure 4:
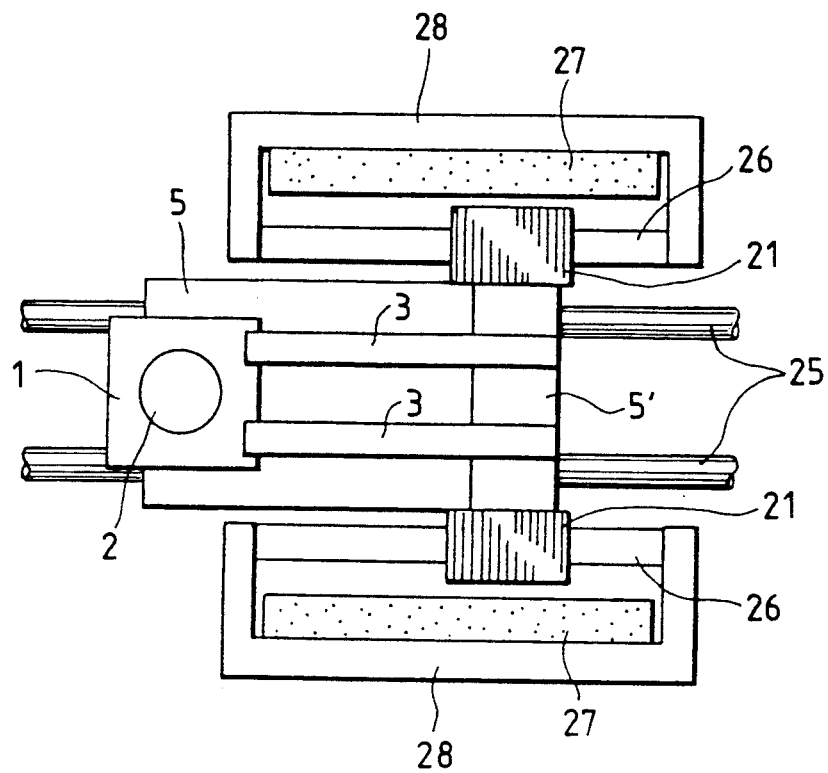
FIG. 4 is a plan view of the driver employing a linear motor based on another embodiment of this inventions.
Figure 5:
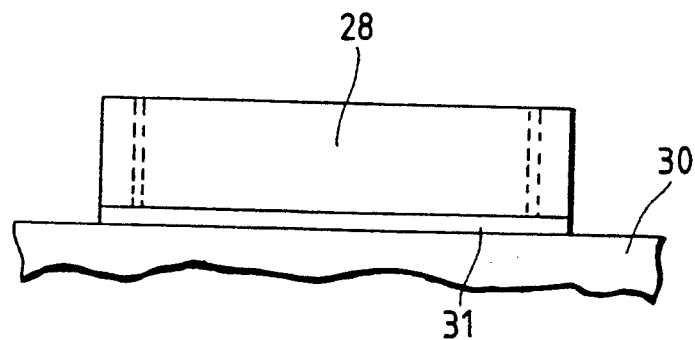
FIG. 5 is a side view showing the supported yoke.
Figure 7:
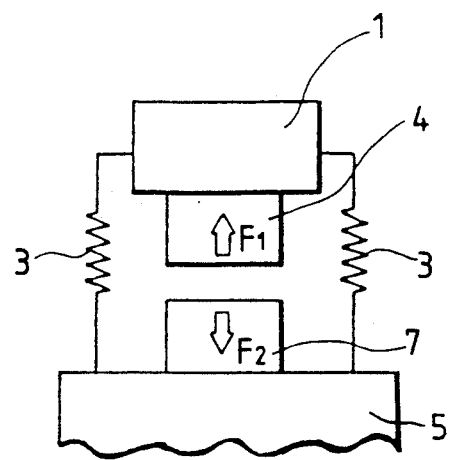
FIG. 7 is a diagram showing by model the transmission of counter force based on the conventional focus correction device.

FIG. 4 and FIG. 5 show a further embodiment of this invention. A pickup chassis 5' which supports the lens holder 1 movably is supported slidably in the tracking direction by means of guide rails 25, and drive coils 21 are fitted on both sides of the chassis 5'. The main chassis 30, which is the stationary part in this case, is supported by yokes 28, each confronted by a yoke 26 and a magnet 27. The drive coil 21 is fitted on the counter yoke 26. The current flowing in the drive coil 21 acts on the magnetic flux between the magnetic 27 and counter yoke 26 to move the pickup chassis 5' in the disc radial direction. This drive force is used for the high-speed access and also for the tracking corrective operation by which the laser beam spot projected by the objective lens 2 is moved finely to follow a track on the disc. In this case, as has been explained in connection with FIG. 7, the drive force has its counter force $F_2$ transmitted as vibrations to the main chassis 30, resulting in the emergence of various problems, e.g., the resonation of the optical disc as mentioned previously. Also in this case, a resilient support member 31 is placed between the yoke 28 and main chassis 30 thereby to lower the transmissibility of the counter force vibration to the main chassis 30.

Although in the explanation of the embodiment of FIG. 3 the lens holder 1 is driven only in the direction of focus correction, an alternative structure is to support the actuator including the magnets and yokes by a resilient support member such that the lens holder 1 is moved in both of the focus correcting direction and the tracking corrective direction. Furthermore, the structure may be the one in which a magnet is mounted on the lens holder 1, with a coil being wound on the coil of stationary part, and the coil is supported by the pickup chassis through a resilient support member.

According to the present invention, as described above, the drive force generator made up of coils and magnets has its counter force transmitted to the stationary part by being weakened by the resilient support member, whereby the adverse influence of the vibration originating from the drive force generator imposed on the focus correction device for the pickup can be prevented.

What is claimed is:

1. In an optical disk player wherein a moving part carries an optical part and is movably supported by a stationary part through a flexible supporting member, said moving part being driven by a drive force generator that includes a coil and a magnet, one of said coil or magnet being attached to said moving part, the other of said coil or magnet being attached to a mounting member, said moving part movable relative to said mounting member, an improvement comprising:

a vibration preventive device attached between said mounting member and said stationary part so as to connect said drive force generator to said stationary part.

2. An optical pickup system comprising:

a moving part carrying an objective lens and movably supported by a stationary part through a supporting member, said moving part being driven by a drive force generator that includes a coil and a magnet, one of said coil or magnet being attached to said moving part, the other of said coil or magnet being attached to a mounting member, said mounting member being supported by said stationary part through a vibration preventive part.

3. In an optical disk player wherein a moving part carries an optical part and is movably supported by a stationary part through a flexible supporting member, said moving part being driven by a drive force generator that includes a coil and a magnet, one of said coil or magnet being attached to said moving part, the other of said coil or magnet being attached to a mounting member, said moving part movable relative to said mounting member, an improvement comprising:

a vibration preventive device attached between said mounting member and said stationary part so as to connect said drive force generator to said stationary part, wherein a first surface of said device contacts said mounting member and is coextensive with a surface of said mounting member contacting said device, and a second surface of said device contacts said stationary part, a surface of said stationary part contacting said second surface of said device and extending beyond all sides of said second surface of said device.

4. In an optical disk player wherein a moving part carries an optical part and is movably supported by a stationary part through a flexible supporting member, said moving part being driven by a drive force generator that includes a coil and a magnet, one of said coil or magnet being attached to said moving part, the other of said coil or magnet being attached to a mounting member, said moving part movable relative to said mounting member, an improvement comprising:

a vibration preventive device attached between said mounting member and said stationary part so as to connect said drive force generator to said stationary part, wherein said device is a beam with first and second ends, said stationary part attached to said first end and said mounting member attached to said second end.

* * * * *